US012681174B2

(12) United States Patent
Takahata

(10) Patent No.: US 12,681,174 B2
(45) Date of Patent: Jul. 14, 2026

(54) OBSTACLE DETECTION DEVICE, OBSTACLE DETECTION METHOD, AND COMPUTER-READABLE MEDIUM

(71) Applicant: Panasonic Intellectual Property Management Co., Ltd., Osaka (JP)

(72) Inventor: Atsushi Takahata, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 141 days.

(21) Appl. No.: 18/409,052

(22) Filed: Jan. 10, 2024

(65) Prior Publication Data

US 2024/0310517 A1     Sep. 19, 2024

(30) Foreign Application Priority Data

Mar. 13, 2023     (JP) ................................. 2023-038265

(51) Int. Cl.
| | |
|---|---|
| *G01S 15/931* | (2020.01) |
| *G01S 15/04* | (2006.01) |
| *G01S 15/86* | (2020.01) |
| *G06V 20/58* | (2022.01) |

(52) U.S. Cl.
CPC ............ *G01S 15/931* (2013.01); *G01S 15/04* (2013.01); *G01S 15/86* (2020.01); *G06V 20/58* (2022.01)

(58) Field of Classification Search
CPC ........ G01S 15/931; G01S 15/04; G01S 15/86; G06V 20/58
See application file for complete search history.

(56) References Cited

U.S. PATENT DOCUMENTS

| | | | | |
|---|---|---|---|---|
| 2002/0171739 A1* | 11/2002 | Yamada | .................... | B60R 1/26 |
| | | | | 348/148 |
| 2009/0259400 A1* | 10/2009 | Coats | ...................... | G01S 13/87 |
| | | | | 701/301 |
| 2019/0130756 A1* | 5/2019 | Ghannam | .............. | G10K 15/04 |
| 2023/0406359 A1* | 12/2023 | Fasola | ................. | B60W 50/023 |

FOREIGN PATENT DOCUMENTS

JP          6703471 B2      6/2020

* cited by examiner

*Primary Examiner* — Roy Rhee
(74) *Attorney, Agent, or Firm* — Seed Intellectual Property Law Group LLP

(57) ABSTRACT

An obstacle detection device including: a plurality of ranging sensors configured to transmit ultrasonic waves and receive reflected waves thereof, and disposed on a vehicle to be spaced in a vehicle width direction; a camera disposed on the vehicle and configured to acquire an image corresponding to detection areas of the plurality of ranging sensors; and a control circuit configured to detect an obstacle around the vehicle, based on the reflected waves received and the image. The control circuit is configured to detect an obstacle, based on the image acquired by the camera during a predetermined period between transmission of an ultrasonic wave by a first ranging sensor and reception of a first reflected wave thereof, the image being acquired for a detection area of a different ranging sensor other than the first ranging sensor.

10 Claims, 7 Drawing Sheets

OBSTACLE DETECTION DEVICE, OBSTACLE DETECTION METHOD, AND COMPUTER-READABLE MEDIUM

CROSS-REFERENCE TO RELATED APPLICATIONS

This application is based upon and claims the benefit of priority from Japanese Patent Application No. 2023-038265, filed on Mar. 13, 2023, the entire contents of which are incorporated herein by reference.

FIELD

Embodiments described herein relate generally to an obstacle detection device, an obstacle detection method, and a computer-readable medium.

BACKGROUND

Obstacle detection devices are mounted on vehicles. The obstacle detection devices detect objects such as vehicles ahead, obstacles, and pedestrians. The obstacle detection devices include a ranging sensor. The obstacle detection devices have a known technique of performing various kinds of control for enhancing vehicle traveling safety, for example, operating an automatic brake or making a notification to a driver, based on the results of object detection by the ranging sensor.

An obstacle detection device based on an existing technique has been described in Japanese Patent No. 6703471, for example. The obstacle detection device based on the technique described in Japanese Patent No. 6703471 includes: an ultrasonic sensor configured to receive a reflected wave of a transmitted wave transmitted from a vehicle and measure a distance to an object; and an in-vehicle camera configured to capture an image of the surroundings of the vehicle, and, when the vehicle is approaching the object, the obstacle detection device changes the detection sensitivity of the ultrasonic sensor in accordance with the position of the vehicle with respect to the object.

DETAILED DESCRIPTION

An obstacle detection device according to the present disclosure includes a plurality of ranging sensors, a camera, and a control circuit. The plurality of ranging sensors are configured to transmit ultrasonic waves and receive reflected waves of the ultrasonic waves, and disposed on a vehicle to be spaced in a vehicle width direction. The camera is disposed on the vehicle and configured to acquire an image corresponding to detection areas of the plurality of ranging sensors. The control circuit is configured to detect an obstacle around the vehicle, based on the reflected waves received by the plurality of ranging sensors and the image acquired by the camera. The control circuit is configured to detect the obstacle, based on the image acquired by the camera during a predetermined period between transmission of an ultrasonic wave by a first ranging sensor out of the plurality of ranging sensors and reception of a first reflected wave thereof, the image being acquired for a detection area of a different ranging sensor other than the first ranging sensor among the plurality of ranging sensors. Hereinafter, a preferred embodiment according to the present disclosure will be described in detail with reference to the drawings. Note that the present disclosure is not limited by the embodiment, and if a plurality of embodiments is offered, the present disclosure also includes a combination of the embodiments. Furthermore, constituents in the embodiment include those that can be easily conceived by those skilled in the art, those that are substantially identical to the constituents, and those that are, what is called, equivalents.

First Embodiment

Obstacle Detection Device

Figure 1:
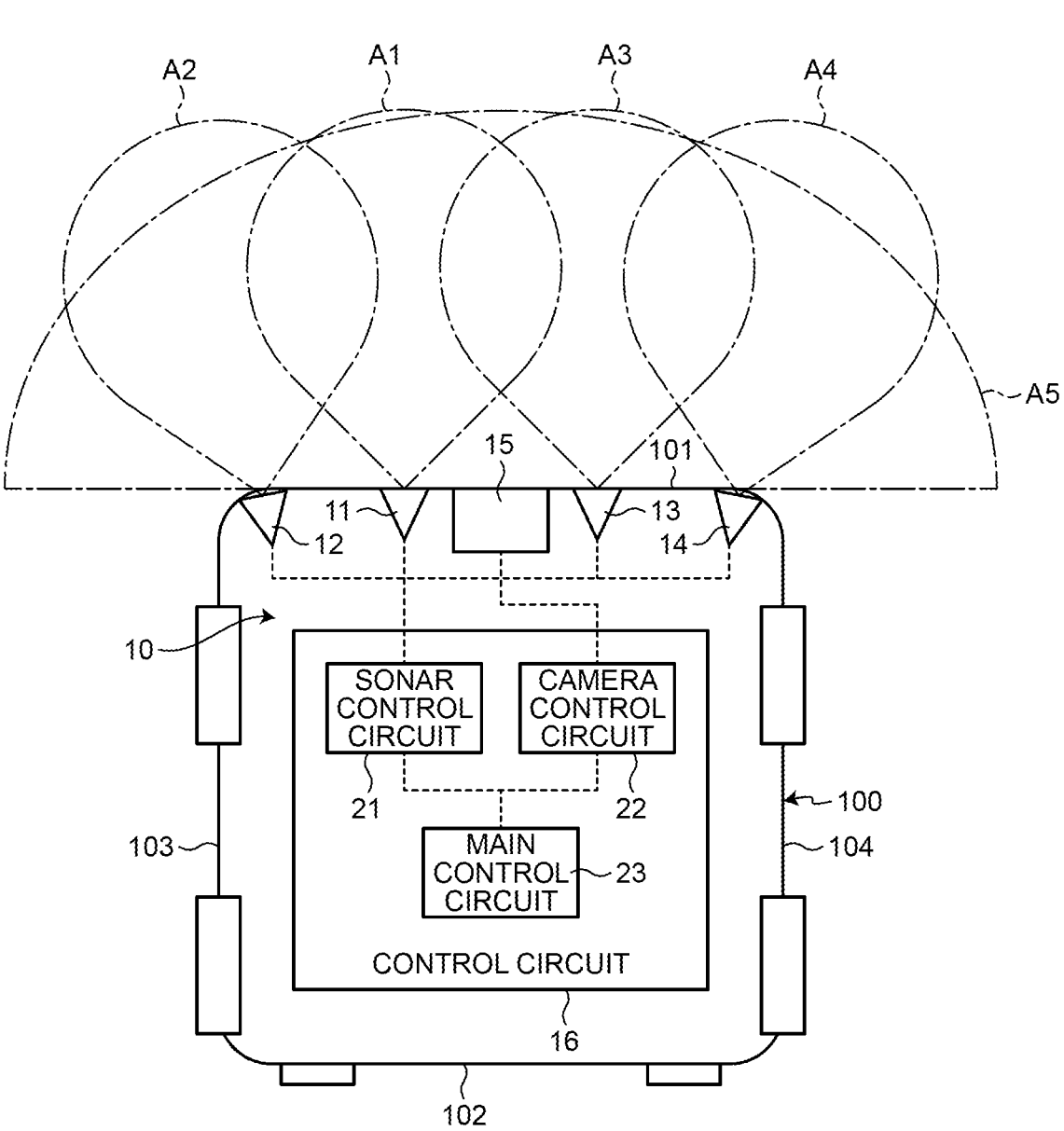
FIG. 1 is a plan view of a vehicle equipped with an obstacle detection device according to a first embodiment.

As illustrated in FIG. 1, an obstacle detection device 10 is mounted on a vehicle 100. The obstacle detection device 10 includes a plurality of sonars (ranging sensors) 11, 12, 13, 14, a camera 15, and a control circuit 16.

The sonars 11, 12, 13, 14 are disposed on a rear end portion 101 of the vehicle 100 to be spaced on a vehicle width direction. However, besides the rear end portion 101 of the vehicle 100, the sonars 11, 12, 13, 14 may be disposed on a front-end portion 102 or left- and right-side portions 103, 104. In the first embodiment, the four sonars 11, 12, 13, and 14 are provided, but the number of the sonars is not limited to four, and two or more sonars are beneficially provided.

The sonars 11, 12, 13, 14 each include a transmitting section and a receiving section. One microphone may constitute both the transmitting section and the receiving section, or alternatively two or more microphones may constitute the transmitting section and the receiving section separately. The transmitting section transmits an ultrasonic wave. The receiving section receives a reflected wave of the ultrasonic wave transmitted by the transmitting section. The sonars 11, 12, 13, 14 each transmit an ultrasonic wave in a rearward direction from the rear end portion 101 of the vehicle 100 and receive a reflected wave resulting from a collision of the ultrasonic wave with an object. Here, the object or obstacle is, for example, another vehicle, an obstacle, or a pedestrian, and does not include what does not obstruct the traveling of the vehicle 100, such as protrusions and recessions of a road surface.

For the sonars 11, 12, 13, 14, detection areas A1, A2, A3, A4 are set, respectively. The detection areas A1, A2, A3, A4 serve as transmission areas to which ultrasonic waves are transmitted by the transmitting sections and also serve as reception areas of the receiving sections. The detection areas A1, A2, A3, A4 are elliptical in shape, and partially overlap each other. For example, the sonars 11, 12, 13, 14 are disposed on the rear end portion 101 of the vehicle 100 to be spaced in a direction intersecting the directions of transmission and reception of ultrasonic waves, for example, in the vehicle width direction, so that the detection areas A1, A2, A3, A4 partially overlap each other.

The camera 15 is disposed at the center in the vehicle width direction of the rear end portion 101 of the vehicle 100. However, besides the rear end portion 101 of the vehicle 100, the camera 15 may be provided in the front-end portion 102 or the left- and right-side portions 103, 104. A plurality of the cameras 15 may be provided in the rear end portion 101 of the vehicle 100 to be spaced in the vehicle width direction.

The camera 15 is an imaging device and acquires an image of the rear of the vehicle 100. An imaging area A5 is set for the camera 15. The imaging area A5 is semicircular in shape. The camera 15 acquires an image of the imaging area A5 corresponding to the detection areas A1, A2, A3, A4 of the sonars 11, 12, 13, 14. In this case, the detection areas A1, A2, A3, and A4 of the sonars 11, 12, 13, and 14 and the imaging area A5 of the camera 15 almost overlap each other, but may not overlap each other to some extent. The imaging area A5 of the camera 15 is close to the rear end portion 101 of the vehicle 100, and the detection areas A1, A2, A3, A4 of the sonars 11, 12, 13, and 14 are slightly far from the rear end portion 101 of the vehicle 100, but may be a close area or the equivalent area.

The control circuit 16 is disposed on the vehicle 100. The control circuit 16 includes a sonar control circuit 21, a camera control circuit 22, and a main control circuit 23. In the first embodiment, the sonar control circuit 21, the camera control circuit 22, and the main control circuit 23 are provided in the control circuit 16, but this configuration is merely for the purpose of making the functions of the control circuits easier to understand. Therefore, the sonar control circuit 21 and the camera control circuit 22 may be collectively one control circuit, or alternatively the sonar control circuit 21, the camera control circuit 22, and the main control circuit 23 may be collectively one control circuit.

The control circuit 16 detects an obstacle behind the vehicle, based on the results of detection by the sonars 11, 12, 13, 14 and the image acquired by the camera 15. In this case, when a sonar and a camera are disposed on the front-end portion 102 and the left- and right-side portions 103, 104 of the vehicle 100, besides the rear end portion 101 of the vehicle 100, the control circuit 16 can detect obstacles all around the vehicle 100, based on the results of detection by the sonars and an image acquired by the camera.

The sonar control circuit 21 is connected to the sonars 11, 12, 13, 14. In each of the sonars 11, 12, 13, 14, the transmitting section transmits an ultrasonic wave, and a reflected wave reflected from an object around the vehicle 100 is received. For the sonars 11, 12, 13, 14, the sonar control circuit 21 outputs the timing for transmitting an ultrasonic wave to the transmitting section of each of the sonars 11, 12, 13, 14. To the sonar control circuit 21, signals are inputted, the signals indicating the reception of the reflected waves reflected by the sonars 11, 12, 13, 14 from the object around the vehicle 100. By measuring a period between the transmission of the ultrasonic wave to the reception of the reflected wave, the sonar control circuit 21 detects the object around the vehicle 100 and calculates the distance to the detected object.

The camera control circuit 22 is connected to the camera 15. The camera 15 acquires an image of an area behind the vehicle 100. To the camera control circuit 22, image data acquired by the camera 15 are inputted. The image data inputted to the camera control circuit 22 from the camera 15 are moving or still images. The camera control circuit 22 recognizes the object by image processing of the image data inputted from the camera 15. The camera control circuit 22 has an image signal processor (ISP) function.

The main control circuit 23 is connected to the sonar control circuit 21 and the camera control circuit 22. To the main control circuit 23, the results of object detection in the detection areas A1, A2, A3, A4 of the respective sonars 11, 12, 13, 14 are inputted from the sonar control circuit 21. To the main control circuit 23, the image data obtained after the image processing in the imaging area A5 of the camera 15 are inputted from the camera control circuit 22. The main control circuit 23 detects an obstacle behind the vehicle 100, based on the results of object detection in the detection areas A1, A2, A3, A4 and the image data in the imaging area A5.

Furthermore, during a predetermined period between the transmission of an ultrasonic wave by the transmitting section of one of the sonars 11, 12, 13, 14 and the reception of a reflected wave by the receiving section thereof, the main control circuit 23 detects an obstacle, based on the image acquired by the camera 15, for the detection areas of the other sonars. In this case, the main control circuit 23 detects an obstacle for the detection area of the one sonar after recognizing the image acquired by the camera 15. Furthermore, when the main control circuit 23 detects the obstacle, based on the image acquired by the camera 15, the main control circuit 23 caused the sonar control circuit 21 to increase the obstacle detection sensitivity of the sonars 11, 12, 13, 14.

Method for Detection Processing by Camera and Sonars

Figure 2:
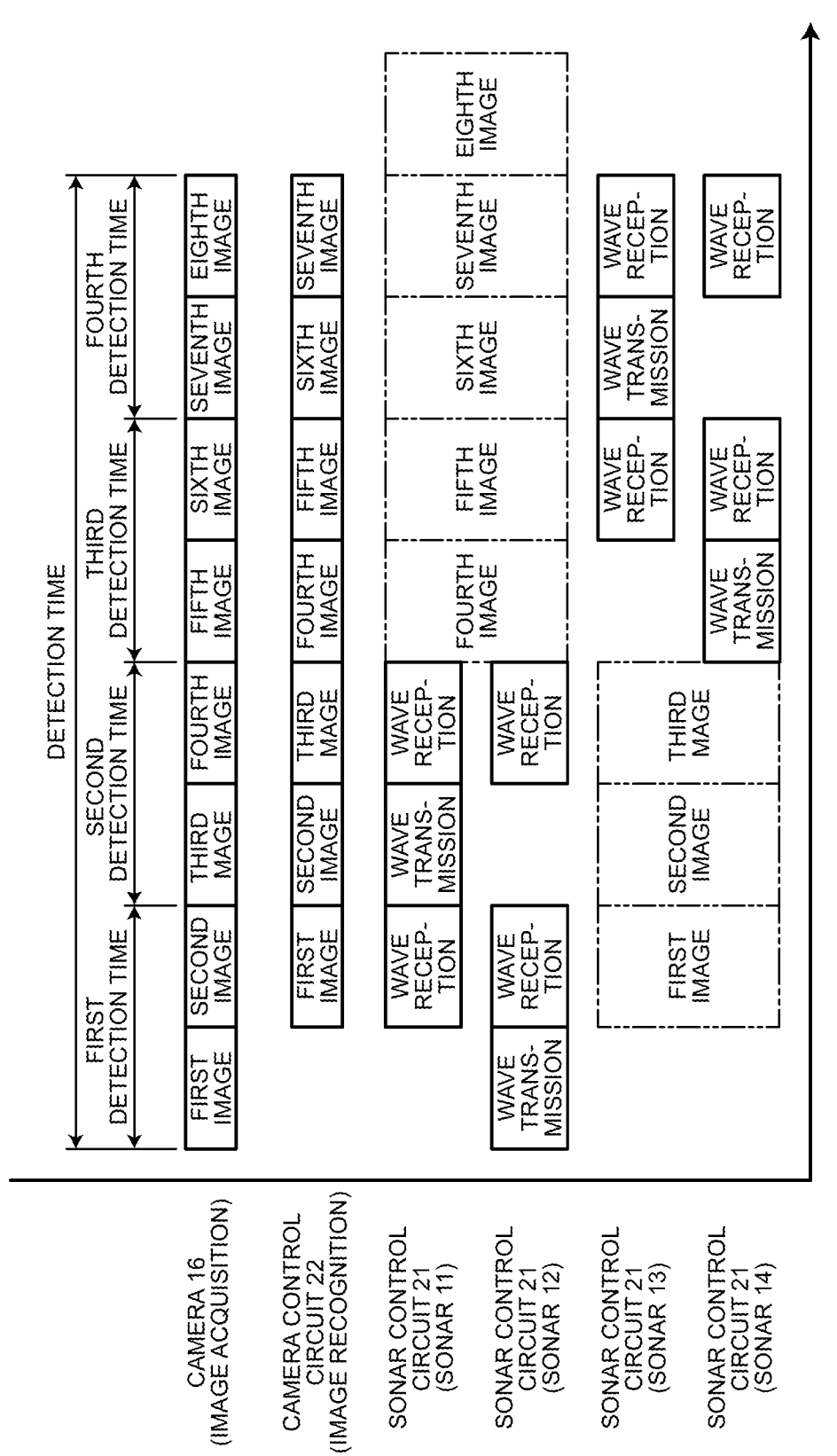
FIG. 2 is a time chart illustrating the flow of detection processing performed using a camera and a sonar of the obstacle detection device.

As illustrated in FIGS. 1 and 2, the detection areas A1, A2, A3, A4 partially overlap each other, and accordingly the sonars 11, 12, 13, 14 transmit and receive ultrasonic waves in the order of the sonar 12, the sonar 11, the sonar 14, and the sonar 13. On the other hand, the camera 15 operates all the time to acquire images in the imaging area A5. Note that the sonars 11, 12, 13, 14 may transmit and receive ultrasonic waves in the order of the sonar 11, the sonar 12, the sonar 14, and the sonar 13, or may transmit and receive ultrasonic waves in the order of sonar 11, sonar 12, sonar 13, and sonar 14.

A detection time for obstacle detection using the sonars 11, 12, 13, 14 and the camera 15 is divided into a first detection time, a second detection time, a third detection time, and a fourth detection time corresponding to the four sonars 11, 12, 13, 14. The sonar 12 transmits an ultrasonic wave during the first detection time, the sonar 11 transmits an ultrasonic wave during the second detection time, the sonar 14 transmits an ultrasonic wave during the third detection time, and the sonar 13 transmits an ultrasonic wave during the fourth detection time. The camera 15 acquires an image during each of the first detection time, the second detection time, the third detection time, and the fourth detection time.

First, during the first detection time, the sonar 12 transmits an ultrasonic wave, and the sonars 11, 12 receive a reflected wave and output the reflected wave to the sonar control circuit 21. Furthermore, during the first detection time, the camera 15 acquires a first image at a time when the sonar 12 transmits the ultrasonic wave, and the camera 15 acquires a second image and outputs the second image to the camera control circuit 22 at a time when the sonars 11, 12 receive the reflected wave. Next, during the second detection time, the sonar 11 transmits an ultrasonic wave, and the sonars 11, 12 receive a reflected wave and output the reflected wave to the sonar control circuit 21. Furthermore, during the second detection time, the camera 15 acquires a third image at a time when the sonar 11 transmits the ultrasonic, and the camera 15 acquires a fourth image and outputs the fourth image to the camera control circuit 22 at a time when the sonars 11, 12 receives the reflected wave by.

The camera control circuit 22 performs image processing of the first image to perform image recognition of an object in the second half of the first detection time, and performs image processing of the second image to perform image recognition of the object in the first half of the second detection time. Furthermore, the camera control circuit 22 performs image processing of the third image to perform image recognition of the object in the second half of the second detection time, and performs image processing of the fourth image to perform image recognition of the object in the first half of the third detection time.

Likewise, during the third detection time, the sonar 14 transmits an ultrasonic wave and the sonars 13, 14 receive a reflected wave and output the reflected wave to the sonar control circuit 21. Furthermore, during the third detection time, the camera 15 acquires a fifth image at a time when the sonar 14 transmits the ultrasonic wave, and the camera 15 acquires a sixth image and outputs the sixth image to the camera control circuit 22 at a time when the sonars 11, 12 receive the reflected wave. Then, during the fourth detection time, the sonar 13 transmits an ultrasonic wave, and the sonars 13, 14 receive a reflected wave and output the reflected wave to the sonar control circuit 21. Furthermore, during the fourth detection time, the camera 15 acquires a seventh image at a time when the sonar 13 transmits the ultrasonic wave, and the camera 15 acquires an eighth image and outputs the eighth image to the camera control circuit 22 at a time when the sonars 13, 14 receive the reflected wave.

The camera control circuit 22 performs image processing of the fifth image to perform image recognition of the object in the second half of the third detection time, and performs image processing of the sixth image to perform image recognition of the object in the first half of the fourth detection time. Furthermore, the camera control circuit 22 performs image processing of the seventh image to perform image recognition of the object in the second half of the fourth detection time, and performs image processing of the eighth image to perform image recognition of the object in the first half of the first detection time in the next cycle.

During a detection time including the first detection time, the second detection time, the third detection time, and the fourth detection time, the main control circuit 23 detects an obstacle behind the vehicle 100, based on the results of object detection in the detection areas A1, A2, A3, A4, the results being inputted from the sonar control circuit 21, and image data in the imaging area A5 that are inputted from the camera control circuit 22.

At this time, during the first detection time from the transmission of the ultrasonic wave by the transmitting section of the sonar 12 to the reception of the reflected wave by the receiving section thereof and the second detection time from the transmission of the ultrasonic wave by the transmitting section of the sonar 11 to the reception of the reflected wave by the receiving section thereof, object detection in the detection areas A1, A2 can be performed. However, the sonars 13, 14 are not in operation during the first detection time and the second detection time, and therefore, it is difficult to perform object detection in the detection areas A3, A4.

Therefore, during the first detection time and the second detection time in which the sonars 13, 14 are not in operation, object detection in the detection areas A3, A4 is performed, based on the image acquired by the camera 15. For example, during the first detection time and the second detection time, object detection in the detection areas A3, A4 is performed, based on the first, second, and third images acquired by the camera 15 and recognized by the camera control circuit 22.

Likewise, during the third detection time and the fourth detection time in which the sonars 11, 12 are not in operation, object detection in the detection areas A1, A2 is performed, based on the image acquired by the camera 15. For example, during the third detection time and the fourth detection time, object detection in the detection areas A1, A2 is performed, based on the fourth, fifth, sixth, and seventh images acquired by the camera 15 and recognized by the camera control circuit 22.

When the main control circuit 23 detects an obstacle in the detection areas A3, A4 based on the first, second, and third images acquired by the camera 15 during the first detection time and the second detection time, the main control circuit 23 causes the sonar control circuit 21 to increase the obstacle detection sensitivity of the sonars 13, 14 to be operated in the third detection time and the fourth detection time.

In the description above, the object detection was performed using the time-delayed images acquired by the camera 15 and recognized by the camera control circuit 22 during the detection time in which any of the sonars 11, 12, 13, 14 is not in operation. However, the time-delay period of the images may be suitably set in accordance with the performance of the camera 15 or the camera control circuit 22. In the case where object detection is performed based on the images acquired by the camera 15 during the detection time in which the sonars 11, 12, 13, 14 are not in operation, the camera control circuit 22 preferably reduces processing time without distortion correction processing.

Obstacle Detection Method

Figure 3:
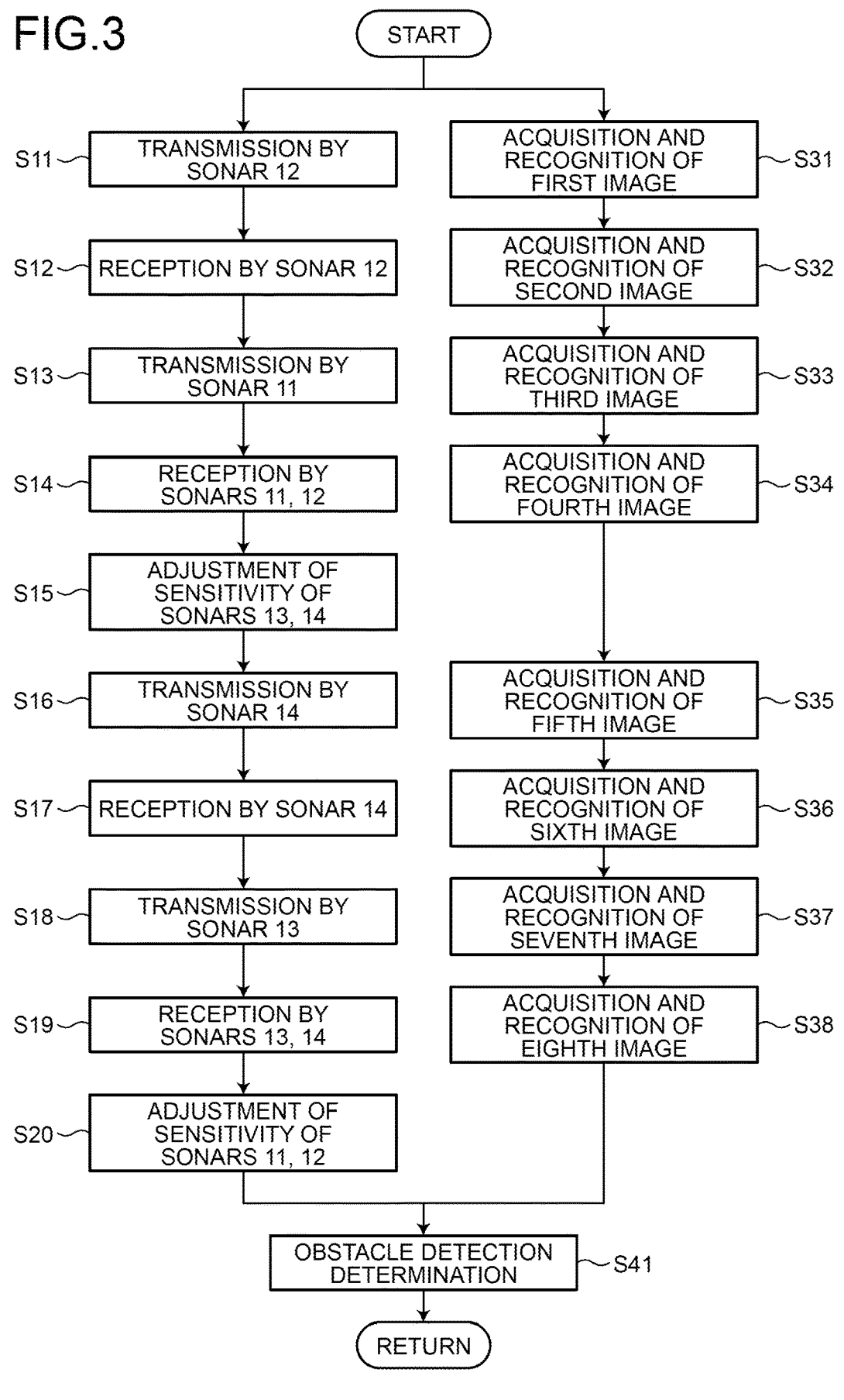
FIG. 3 is a flowchart illustrating an obstacle detection method.

As illustrated in FIGS. 1 and 3, in the operation of the sonars 11, 12, 13, 14 and the processing by the sonar control circuit 21, the sonar 12 transmits an ultrasonic wave at step S11 and the sonars 11, 12 receive the reflected wave at step S12. At step S13, the sonar 11 transmits an ultrasonic wave, and at step S14, the sonars 11, 12 receive the reflected wave. At step S15, the sensitivity of the sonars 13, 14 is adjusted. Subsequently, at step S16, the sonar 14 transmits an ultrasonic wave, and at step S17, the sonars 13, 14 receive the reflected wave. At step S18, the sonar 13 transmits an ultrasonic wave, and at step S19, the sonars 13, 14 receive the reflected wave. At step S20, the sensitivity of the sonars 11, 12 is adjusted.

In the operation of the camera 15 and the processing by the camera control circuit 22, the first image is acquired and then the first image is recognized at step S31. At step S32, the second image is acquired, and then recognition processing is performed for the second image. At step S33, the third image is acquired, and then recognition processing is performed for the third image. At step S34, the fourth image is acquired, and then recognition processing is performed for the fourth image. At step S35, the fifth image is acquired, and then recognition processing is performed for the fifth image. At step S36, the sixth image is acquired, and then recognition processing is performed for the sixth image. At step S37, the seventh image is acquired, and then recognition processing is performed for the seventh image. At step S38, the eighth image is acquired, and then recognition processing is performed for the eighth image.

At step S41, the main control circuit 23 detects an obstacle behind the vehicle 100, based on the results of object detection in the detection areas A1, A2, A3, A4, the results being inputted from the sonar control circuit 21, and image data in the imaging area A5 that are inputted from the camera control circuit 22. Here, during the predetermined period between the transmission of the ultrasonic wave by the transmitting section of one of the sonars 11, 12, 13, 14 and the reception of the reflected wave by the receiving section thereof, the main control circuit 23 detects an obstacle, based on the image acquired by the camera 15, for the detection areas of the other sonars.

Furthermore, when the main control circuit 23 detects an obstacle in the detection areas A3, A4, based on the first, second, and third images acquired by the camera 15, the main control circuit 23 causes the sonar control circuit 21 to increase the obstacle detection sensitivity of the sonars 13, 14 to be operated in the third detection time and the fourth detection time.

Second Embodiment

Figure 4:
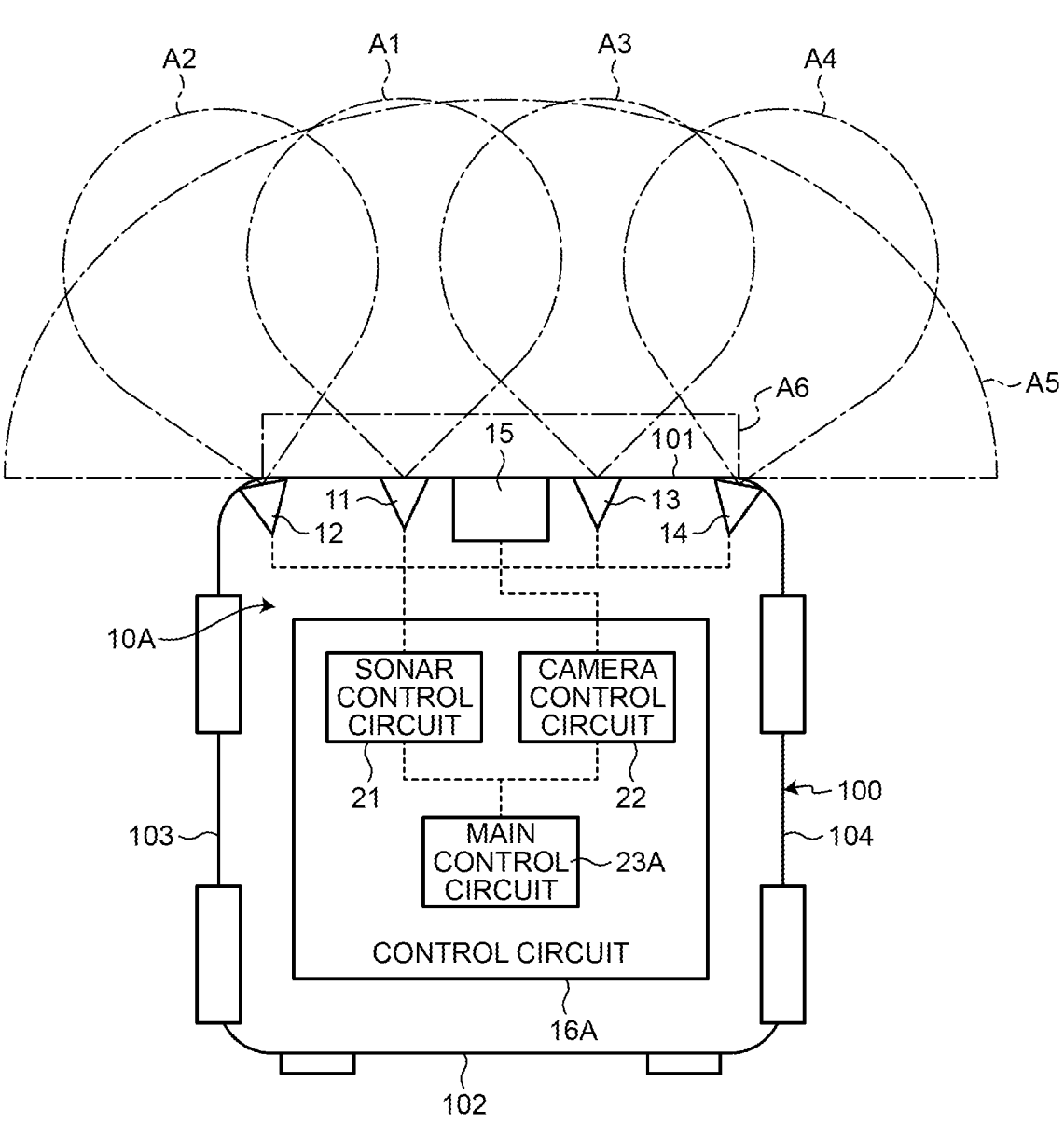
FIG. 4 is a plan view of a vehicle equipped with an obstacle detection device according to a second embodiment.

As illustrated in FIG. 4, an obstacle detection device 10A is mounted on a vehicle 100. The obstacle detection device 10 includes a plurality of sonars 11, 12, 13, 14, a camera 15, and a control circuit 16A. The control circuit 16A includes a sonar control circuit 21, a camera control circuit 22, and a main control circuit 23A.

The main control circuit 23 detects an obstacle, based on an image of a blind spot area A6 corresponding to a detection blind spot of the sonars 11, 12, 13, 14 around the vehicle 100 in the image acquired by the camera 15. Note that the blind spot area A6 may be an area outside detection areas A1, A2, A3, A4 of the sonars 11, 12, 13, 14, or the blind spot area A6 may be an area set as a non-target of detection by the sonars 11, 12, 13, 14 in the case where a component attached to the vehicle (for example, a trailer hitch) is present inside the detection area A1, A2, A3, or A4. Alternatively, in the case where a component attached to the vehicle (for example, a trailer hitch attached to a rear portion of the vehicle) is present inside the detection area A1, A2, A3, or A4, the control circuit 16A may not perform sonar detection for a certain period of time. For example, when the control circuit 16A receives an input from another control circuit of the vehicle concerning the connection of a trailer to a trailer hitch, the control circuit 16A may exert control not to perform sonar detection.

For the sonars 11, 12, 13, 14, the detection areas A1, A2, A3, A4 are set, respectively, and the detection areas A1, A2, A3, A4 partially overlap each other. An imaging area A5 is set for the camera 15. The detection areas A1, A2, A3, A4 of the sonars 11, 12, 13, 14 and the imaging area A5 of the camera 15 almost overlap each other, but do not overlap each other to some extent. The imaging area A5 of the camera 15 is close to a rear end portion 101 of the vehicle 100, and the detection areas A1, A2, A3, A4 of the sonars 11, 12, 13, 14 are slightly far from the rear end portion 101 of the vehicle 100. Therefore, the sonars 11, 12, 13, 14 have the blind spot area A6 in an area close to the rear end portion 101 of the vehicle 100.

Therefore the main control circuit 23 detects an obstacle, based on the image acquired by the camera 15 and recognized by the camera control circuit 22, for the blind spot area A6 which is in the vicinity of the rear end portion 101 of the vehicle 100 and in which the sonars 11, 12, 13, 14 are difficult to perform the detection.

Note that the sonars 11, 12, 13, 14 are disposed to be exposed in the rear end portion 101 of the vehicle 100, hence there is a possibility that foreign matters adhere to surfaces of the sonars 11, 12, 13, 14 to make the transmission of an ultrasonic wave and the reception of a reflected wave difficult. Therefore, when no signal indicating the reception of the reflected wave from sonars 11, 12, 13, 14 is inputted to the sonar control circuit 21, the sonar control circuit 21 detects an obstacle, based on the images acquired by the camera 15 and recognized by the camera control circuit 22, for the detection areas A1, A2, A3, A4 of the sonars 11, 12, 13, 14 not having received a reflected wave.

Figure 5:
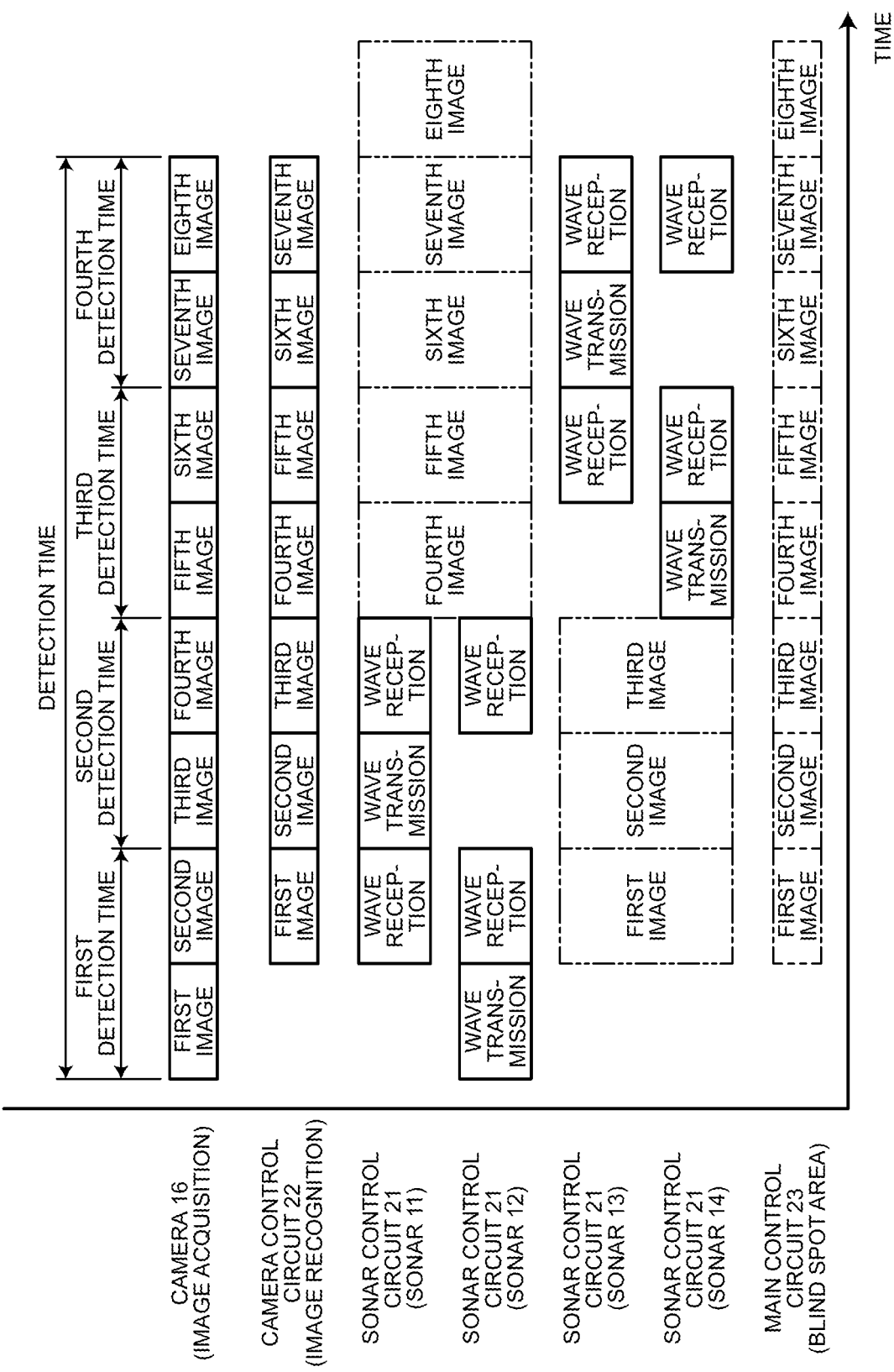
FIG. 5 is a time chart illustrating the operation of the camera and the sonar by the obstacle detection device.

As illustrated in FIG. 5, the main control circuit 23 detects an obstacle, based on the first image recognized by the camera control circuit 22, during the first detection time. The main control circuit 23 detects an obstacle, based on the second image recognized by the camera control circuit 22, during the second detection time. Likewise, the main control circuit 23 detects an obstacle, based on the fourth and fifth images recognized by the camera control circuit 22, during the third detection time. The main control circuit 23 detects an obstacle, based on the sixth and seventh images recognized by the camera control circuit 22, during the fourth detection time.

Control System

Figure 6:
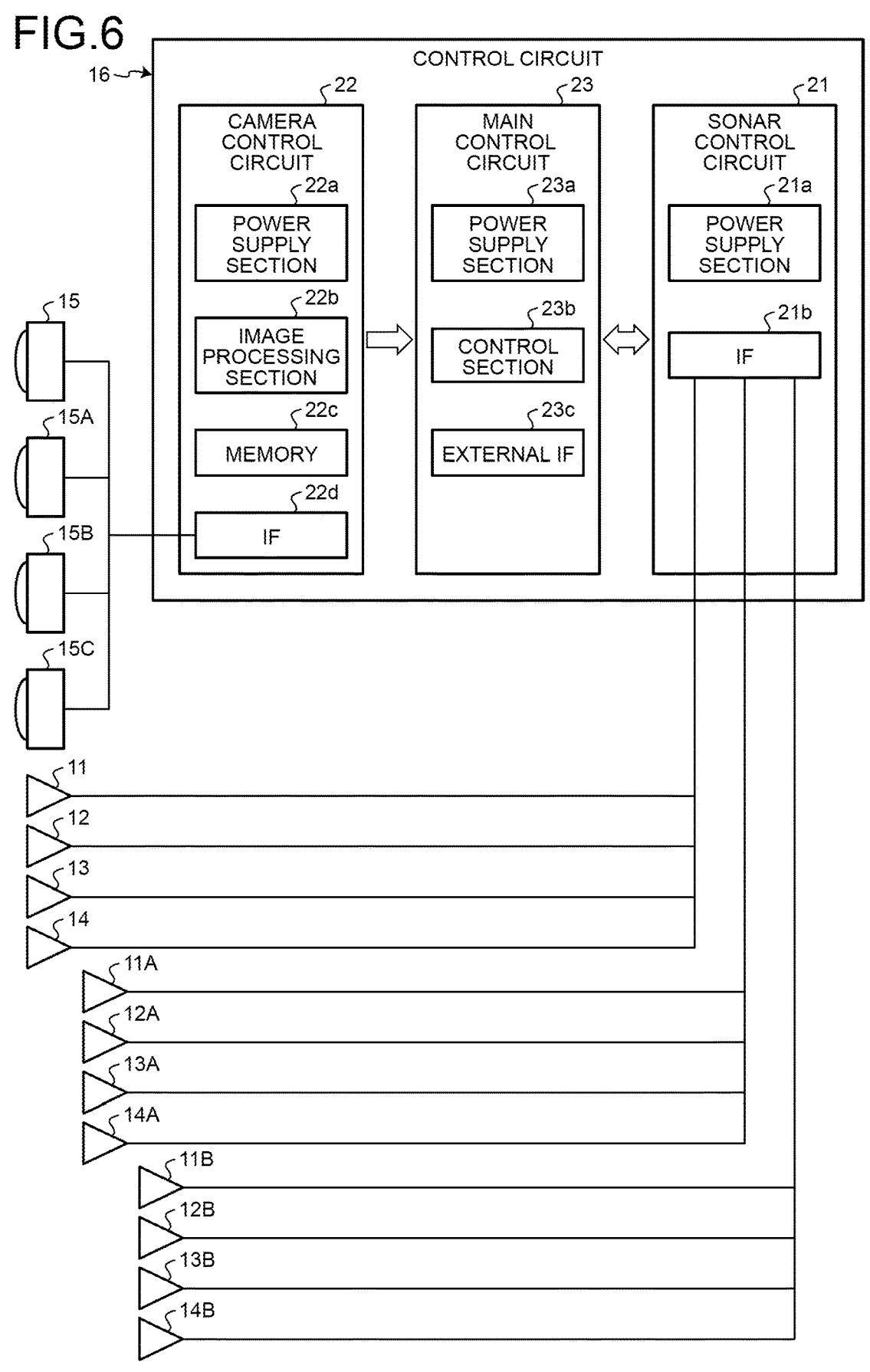
FIG. 6 is a block diagram illustrating a control system of the obstacle detection device.

As illustrated in FIG. 6, the control circuit 16 includes the sonar control circuit 21, the camera control circuit 22, and the main control circuit 23. The sonar control circuit 21 includes a power supply section 21a and an interface (IF) 21b. The sonar control circuit 21 connects the interface 21b to the sonars 11, 12, 13, 14, the sonars 11A, 12A, 13A, 14A, and the sonars 11B, 12B, 13B, 14B. The sonars 11, 12, 13, 14 are front sonars, the sonars 11A, 12A, 13A, 14A are rear sonars, and the sonars 11B, 12B, 13B, 14B are side sonars.

The camera control circuit 22 includes a power supply section 22a, an image processing section 22b, a memory 22c, and an interface (IF) 22d. The image processing section 22b includes an image signal processor (ISP). The interface 22d of the camera control circuit 22 is connected to the cameras 15, 15A, 15B, 15C. The camera 15 is a rear camera, the camera 15A is a front camera, and the cameras 15B, 15C are the left- and right-side cameras.

The main control circuit 23 includes a power supply section 23a, a control circuit 23b, and an external interface (IF) 23c. The control circuit 23b includes a system on chip (SOC) including a micro processing unit (MPU). However, some functions of the sonar control circuit 21 and the camera control circuit 22 may be integrated, the image processing section 22b may be an SOC, and the control circuit 23b may be an MPU.

Modification of Control System

Figure 7:
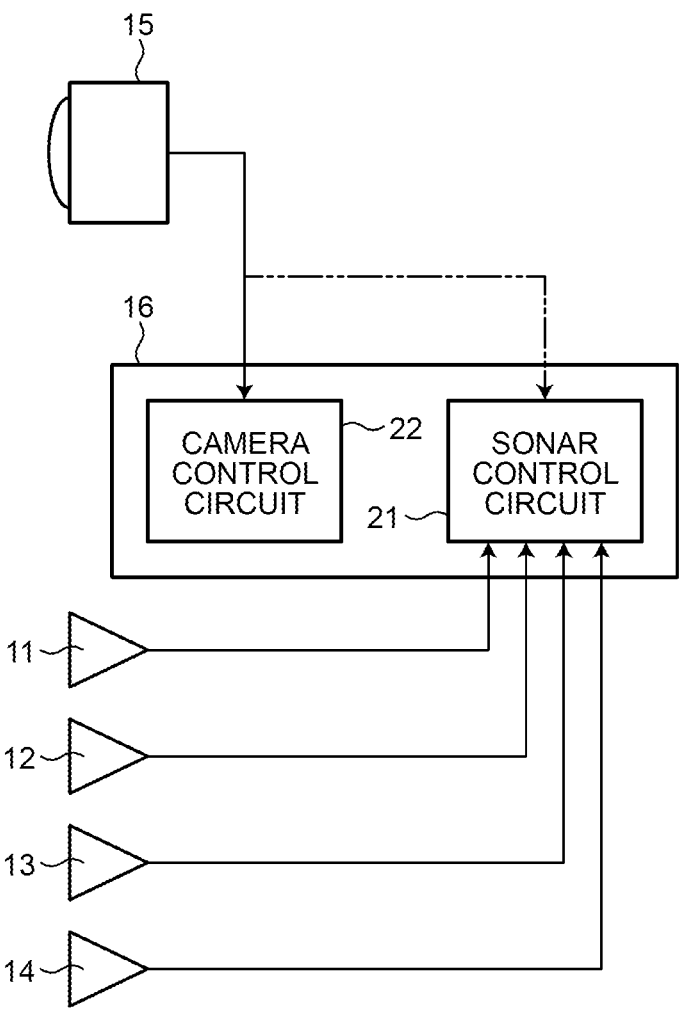
FIG. 7 is a block diagram illustrating a modification of the control system of the obstacle detection device.

As illustrated in FIG. 7, the control circuit 16 includes the sonar control circuit 21 and the camera control circuit 22. The sonar control circuit 21 is connected to the sonars 11, 12, 13, 14, meanwhile the camera control circuit 22 is connected to the camera 15. The sonar control circuit 21 is also connected to the camera 15. Here, the control circuit 23b includes an SOC, the camera control circuit 22 includes a micro controller unit (MCU), and the sonar control circuit 21 includes an MCU. Note that the sonar control circuit 21 includes the MCU for simple image processing. Thus, for example, when some of the sonars 11, 12, 13, 14 have broken down, the sonar control circuit 21 detects an object in the detection area of the broken-down sonar, based on an image acquired by the camera 15.

Effects of Embodiments

An obstacle detection device according to a first aspect includes: a plurality of sonars (ranging sensors) 11, 12, 13, 14 configured to transmit ultrasonic waves and receive reflected waves of the ultrasonic waves and disposed on a vehicle 100 to be spaced in a vehicle width direction; a camera 15 disposed on the vehicle 100 and capable of acquiring an image corresponding to detection areas A1, A2, A3, A4 of the sonars 11, 12, 13, 14; and a control circuit 16, 16A configured to detect an obstacle around the vehicle 100, based on the reflected waves received by the ranging sensors and the image acquired by the camera 15, in which, during a predetermined period between the transmission of an ultrasonic wave by one of the sonars and the reception of a reflected wave by the one sonar, the control circuit 16, 16A detects an obstacle, based on the image acquired by the camera 15, for the detection areas of the other sonars.

According to the obstacle detection device according to the first aspect, for example, the sonars 13, 14 transmit no ultrasonic wave during a predetermined period between the transmission of the ultrasonic waves and the reception of the reflected waves by the sonars 11, 12, and thus, during the predetermined period, an obstacle is detected, based on the image acquired by the camera 15, for the detection areas A3, A4 of the sonars 13, 14. Therefore, obstacle detection can be performed for the detection areas A1, A2, A3, A4 of the sonars 11, 12, 13, 14 all the times, whereby the accuracy of obstacle detection can be enhanced.

An obstacle detection device according to a second aspect detects an obstacle for the detection areas of the other sonars 11, 12, 13, 14 after the recognition of the image acquired by the camera 15. Thus, the accuracy of obstacle detection using the image acquired by the camera 15 can be enhanced.

An obstacle detection device according to a third aspect increases the obstacle detection sensitivity of the sonars 11, 12, 13, 14 when an obstacle is detected based on the image acquired by the camera 15. Thus, the accuracy of obstacle detection by the sonars 11, 12, 13, 14 can be enhanced.

An obstacle detection device according to a fourth aspect detects an obstacle, based on an image of a blind spot area A6 corresponding to the detection blind spot of the sonars 11, 12, 13, 14 around the vehicle 100 in the image acquired by the camera 15. Thus, an obstacle is detected, based on the image acquired by the camera 15, for the blind spot area A6 of the sonars 11, 12, 13, 14, whereby an obstacle in the vicinity of the vehicle 100 can be detected appropriately.

An obstacle detection device according to a fifth aspect detects an obstacle, based on an image acquired by the camera 15, for the detection area of the sonar 11, 12, 13, or 14 having received no reflected wave out of the sonars 11, 12, 13, 14. Thus, even when some of the sonars 11, 12, 13, 14 break down, an obstacle can be properly detected for the detection areas A1, A2, A3, A4.

An obstacle detection device according to a sixth aspect includes a plurality of sonars 11, 12, 13, 14 and a camera 15, the sonars 11, 12, 13, 14 and the camera 15 being disposed on a rear portion of the vehicle 100, and the control circuit 16, 16A stop obstacle detection based on an image of a blind spot area corresponding to a detection blind spot of the sonars 11, 12, 13, 14 around the vehicle 100 in the image acquired by the camera 15, when determining that another vehicle is connected to the rear portion of the vehicle 100. Thus, the accuracy of obstacle detection by the sonars 11, 12, 13, 14 can be enhanced.

In the embodiments described above, the four sonars 11, 12, 13, 14 are configured in such a manner that the sonars 11, 12 constitute one unit and the sonars 13, 14 constitute another unit, and, when one of the units of the sonars 11, 12 and the sonars 13, 14 is not in operation, an obstacle is detected using the image acquired by the camera 15, for the detection areas A1, A2, A3, A4 of the other unit. However, the present disclosure is not limited to this configuration. For example, when one of the four sonars 11, 12, 13, 14, namely, the sonar 11 is in operation, an obstacle may be detected using image acquired by the camera 15 for the detection areas A2, A3, A4 of the other three sonars 12, 13, 14.

The wording " . . . section" in the embodiments above may be replaced by different wording, for example, " . . . circuitry", " . . . assembly", " . . . device", " . . . unit", or " . . . module".

Hereinbefore, the various embodiments were described with reference to the drawings, but, as a matter of course, the present disclosure is not limited to the embodiments. It is clear that those skilled in the art can conceive various changes or modifications within the scope of the claims, and the changes and modifications are also naturally understood to fall within the technical scope of the present disclosure. In addition, the constituents in the embodiments described above may be arbitrarily combined without departing from the spirit of the present disclosure.

Hereinbefore, the specific examples of the present disclosure were described in detail, but are merely examples and do not limit the scope of the claims. The techniques described in the claims include various modifications and variations of the specific examples illustrated above.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

What is claimed is:

1. An obstacle detection device comprising:

a plurality of ranging sensors configured to transmit ultrasonic waves and receive reflected waves of the ultrasonic waves, and disposed on a vehicle to be spaced in a vehicle width direction;

a camera disposed on the vehicle and configured to acquire an image corresponding to detection areas of the plurality of ranging sensors; and a control circuit configured to detect an obstacle around the vehicle, based on the reflected waves received by the plurality of ranging sensors and the image acquired by the camera, wherein the control circuit is configured to detect the obstacle, based on the image acquired by the camera during a predetermined period between transmission of an ultrasonic wave by a first ranging sensor out of the plurality of ranging sensors and reception of a first reflected wave thereof, the image being acquired for a detection area of a second ranging sensor different from the first ranging sensor among the plurality of ranging sensors, the plurality of ranging sensors and the camera are disposed on a rear portion of the vehicle, and the control circuit is configured to, when determining that another vehicle is connected to the rear portion of the vehicle, stop detection of the obstacle, based on an image of a blind spot area corresponding to a detection blind spot of the plurality of ranging sensors around the vehicle in the image acquired by the camera.

2. The obstacle detection device according to claim 1, wherein the control circuit is configured to detect the obstacle for the detection area of the second ranging sensor after recognizing the image acquired by the camera.

3. The obstacle detection device according to claim 1, wherein the control circuit is configured to increase an obstacle detection sensitivity of the plurality of ranging sensors when detecting the obstacle, based on the image acquired by the camera.

4. The obstacle detection device according to claim 1, wherein the control circuit is configured to detect the obstacle, based on the image of the blind spot area corresponding to the detection blind spot of the plurality of ranging sensors around the vehicle in the image acquired by the camera.

5. The obstacle detection device according to claim 1, wherein the control circuit is configured to, when the second ranging sensor out of the plurality of ranging sensors does not receive a second reflected wave of an ultrasonic wave transmitted by the second ranging sensor, detect the obstacle, based on the image acquired by the camera, for the detection area of the second ranging sensor.

6. An obstacle detection method by an obstacle detection device, the method comprising:

receiving, by a first ranging sensor out of a plurality of ranging sensors disposed on a vehicle, a first reflected wave of an ultrasonic wave transmitted by the first ranging sensor;

during a predetermined period between transmission of the ultrasonic wave by the first ranging sensor and reception of the first reflected wave by the first ranging sensor, acquiring, by a camera, an image including a detection area of a second ranging sensor different from the first ranging sensor among the plurality of ranging sensors; and detecting an obstacle around the vehicle, based on the first reflected wave and the image acquired by the camera, wherein ultrasonic waves are sequentially transmitted as the ultrasonic wave and reflected waves of the ultrasonic waves are sequentially received by the plurality of ranging sensors disposed on a vehicle to be spaced in a vehicle width direction, the plurality of ranging sensors and the camera are disposed on a rear portion of the vehicle, and in a case where another vehicle is connected to the rear portion of the vehicle, the method further comprises:

stopping detection of the obstacle, based on an image of a blind spot area corresponding to a detection blind spot of the plurality of ranging sensors around the vehicle in the image acquired by the camera.

7. The obstacle detection method by the obstacle detection device according to claim 6, wherein the obstacle is detected for the detection area of the second ranging sensor after the image acquired by the camera is recognized.

8. The obstacle detection method by the obstacle detection device according to claim 6, further comprising increasing obstacle detection sensitivity of the plurality of ranging sensors when the obstacle is detected based on the image acquired by the camera.

9. The obstacle detection method by the obstacle detection device according to claim 6, further comprising:

detecting the obstacle, based on the image of the blind spot area corresponding to the detection blind spot of the plurality of ranging sensors around the vehicle in the image acquired by the camera.

10. The obstacle detection method by the obstacle detection device according to claim 6, further comprising:

when the second ranging sensor out of the plurality of ranging sensors does not detect a second reflected wave of an ultrasonic wave transmitted by the second ranging sensor, detecting the obstacle, based on the image acquired by the camera, for the detection area of the second ranging sensor.

* * * * *